(12) United States Patent
Zhang et al.

(10) Patent No.: US 8,591,613 B2
(45) Date of Patent: Nov. 26, 2013

(54) ABRASIVE GRAINS HAVING UNIQUE FEATURES

(75) Inventors: Kai Zhang, Westerville, OH (US); Rajeev Pakalapati, Worthington, IN (US); John William Lucek, Powell, OH (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 12/560,719

(22) Filed: Sep. 16, 2009

(65) Prior Publication Data

US 2010/0064594 A1 Mar. 18, 2010

Related U.S. Application Data

(60) Provisional application No. 61/097,527, filed on Sep. 16, 2008.

(51) Int. Cl.
 *B24D 3/02* (2006.01)
 *C09C 1/68* (2006.01)
 *C09K 3/14* (2006.01)

(52) U.S. Cl.
 USPC ............. 51/308; 51/307; 51/309; 423/284; 428/402

(58) Field of Classification Search
 None
 See application file for complete search history.

(56) References Cited

U.S. PATENT DOCUMENTS

| | | | |
|---|---|---|---|
| 2,000,857 A * | 5/1935 | Masin | 51/309 |
| 2,947,617 A | 8/1960 | Wentorf, Jr. | |
| 3,661,521 A | 5/1972 | Birle | |
| 3,841,852 A * | 10/1974 | Wilder et al. | 51/307 |
| 3,916,584 A * | 11/1975 | Howard et al. | 51/308 |
| 4,011,064 A | 3/1977 | Lee et al. | |
| 4,805,586 A | 2/1989 | Borse | |
| 5,000,760 A * | 3/1991 | Ohtsubo et al. | 51/307 |
| 5,015,265 A * | 5/1991 | Corrigan et al. | 51/309 |
| 5,035,771 A | 7/1991 | Borse | |
| 5,062,865 A | 11/1991 | Chen et al. | |
| 5,188,643 A | 2/1993 | Iocovangelo | |
| 5,215,552 A * | 6/1993 | Sung | 51/309 |
| 5,709,598 A * | 1/1998 | Nishio et al. | 451/530 |
| 6,312,324 B1 * | 11/2001 | Mitsui et al. | 451/540 |
| 6,596,040 B2 | 7/2003 | Kim et al. | |
| 7,097,678 B2 * | 8/2006 | Ohtsubo et al. | 51/307 |
| 2005/0081454 A1 * | 4/2005 | Ohtsubo et al. | 51/307 |
| 2005/0118939 A1 * | 6/2005 | Duescher | 451/527 |
| 2005/0220690 A1 | 10/2005 | Ohtsubo | |

FOREIGN PATENT DOCUMENTS

| | | |
|---|---|---|
| JP | 200688243 A | 4/2006 |
| JP | 2006291216 A | 10/2006 |
| WO | 9851419 | 11/1998 |

(Continued)

OTHER PUBLICATIONS

Borazon cubic boron nitride 1000 product. http://www.diamondin-novations.com/en/products/borazoncbn/details/vit/Pages/default.aspx.*

(Continued)

*Primary Examiner* — Kaj K Olsen
*Assistant Examiner* — Ross J Christie
(74) *Attorney, Agent, or Firm* — Frank Y. Gao, Esq.

(57) ABSTRACT

An uncoated abrasive or superabrasive grain having at least one grain face including three or more features projecting from the grain face wherein the height (h) and the lateral length (l) of each feature is greater than about 0.1 micron.

31 Claims, 14 Drawing Sheets

(56) References Cited

FOREIGN PATENT DOCUMENTS

| | | | |
|---|---|---|---|
| WO | 2005019371 | | 3/2005 |
| ZA | 20020522 | | 4/2003 |
| ZA | 200205222 A | * | 4/2003 |

OTHER PUBLICATIONS

Evans, T. et al., Etching of Diamond Surfaces with Gases, Philisophical Magazine, vol. 6, 1961, pp. 429-440.

* cited by examiner

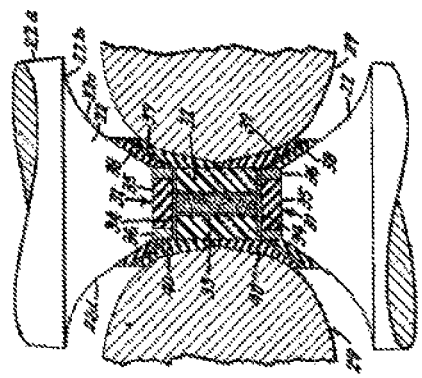
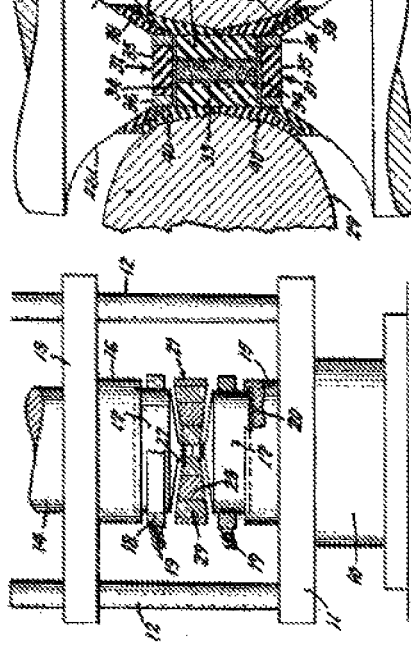
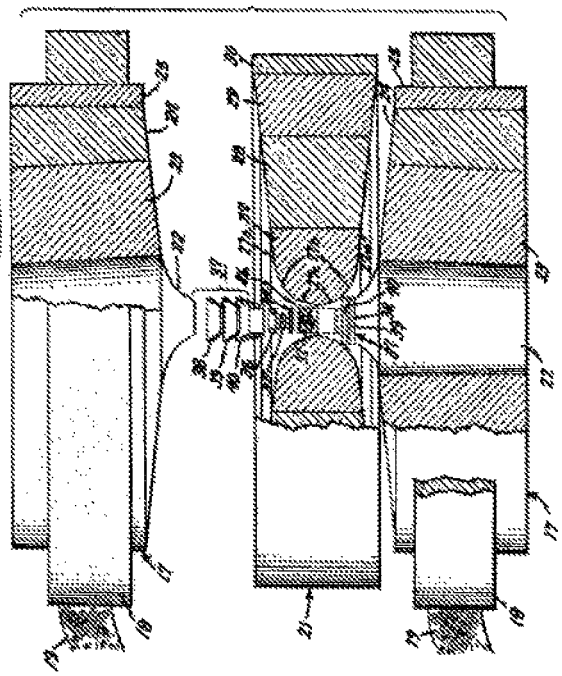

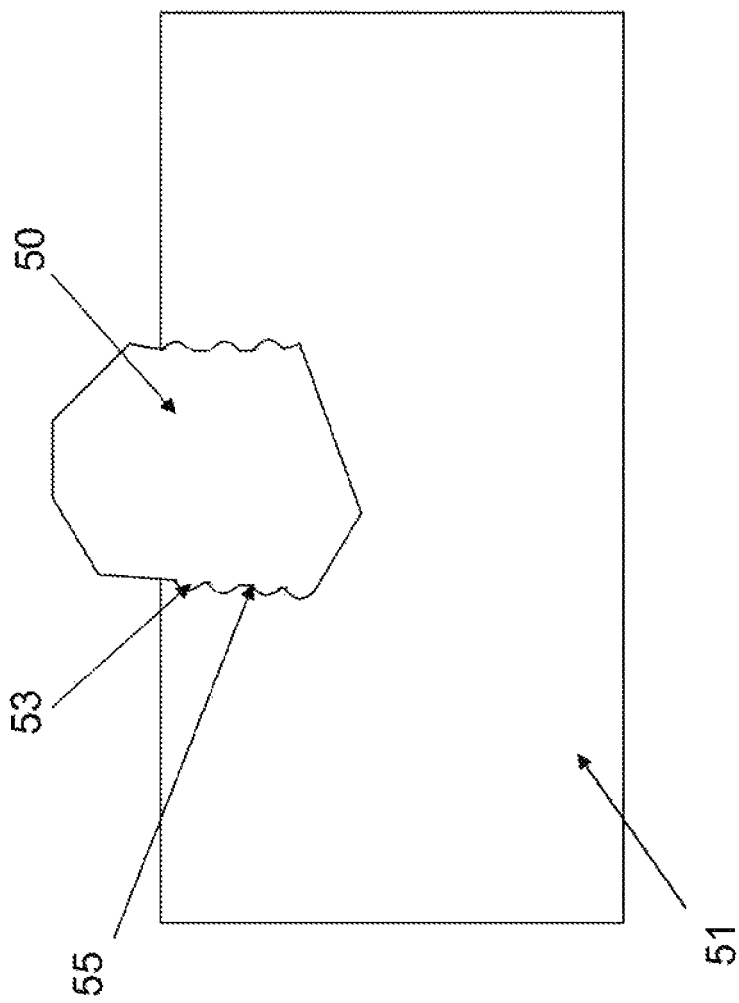

ABRASIVE GRAINS HAVING UNIQUE FEATURES

CROSS-REFERENCE TO RELATED APPLICATIONS

The instant application claims the benefit of prior U.S. Provisional Application Ser. No. 61/097,527, filed Sep. 16, 2008.

BRIEF DESCRIPTION OF THE DRAWINGS

FIG. 1 is a front elevational view of a hydraulic press with a high temperature-high pressure apparatus which may be employed to manufacture the grains taught in the instant application.

FIG. 2 is an enlarged, exploded sectional view of the high temperature-high pressure apparatus of FIG. 1.

FIG. 3 is an enlarged sectional view of the reaction vessel and associated parts which are shown in FIGS. 1 and 2.

FIG. 11 schematically shows a cross section view of the bonding region between the cubic boron nitride grain having unique features and a bond material.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 40%-60%.

Definitions

In the description and examples which follow, a number of terms are used. In order to provide a clear and consistent understanding of the specifications and claims, the following definitions are provided.

The term "abrasive", as used herein, refers to any material used to wear away softer material.

Figure 5:
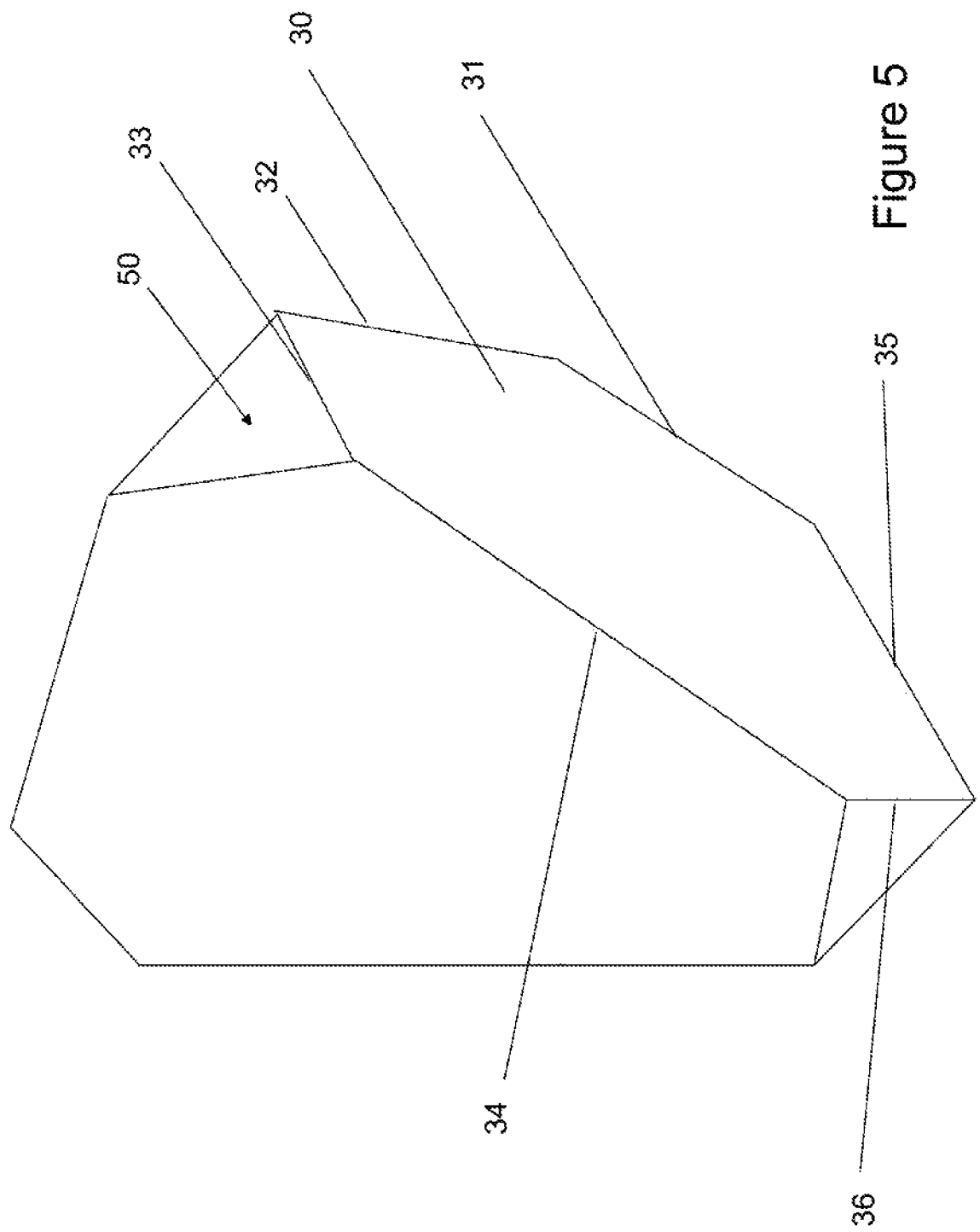
FIG. 5 schematically shows the appearance of a conventional cubic boron nitride grain.

The term "grain face" or "face", as used herein, means an exterior portion of a grain defined by the edges of the grain; see FIG. 5 for an example. Grain 50 includes face 30 defined by edges 31, 32, 33, 34, 35 and 26.

The term "irregular", as used herein, means not substantially straight, not substantially uniform, or not substantially symmetrical.

The term "fluctuant", as used herein, means to rise and fall in or as if in waves and undulate.

The term "random distribution", as used herein, means not having a specific pattern.

The term "concave", as used herein, refers to a surface that is hollowed or rounded inward like the inside of a bowl.

Figure 10:
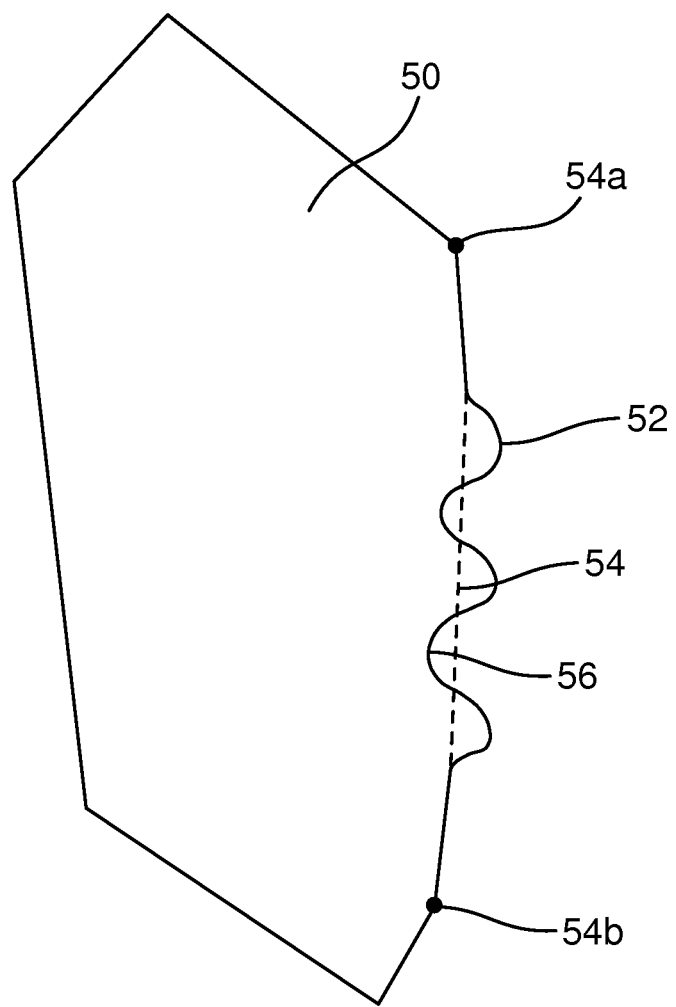
FIG. 10 schematically shows a cross section of an embodiment of a superabrasive grain.

The term "reference surface", as used herein, refers to an imaginary line extending through a two-dimensional image of a grain. The line connects the two points on two opposing edges on the face of a grain. In FIG. 10, the reference surface is shown at 54 connecting points 54a and 54b.

The term "peak", as used herein, refers to any point projecting from a reference surface of the grain. In FIG. 10, the peak is shown at 52.

The term "valley", as used herein, refers to a concavity or angular distance on a face below a reference surface of the grain. In FIG. 10, the valley is shown at 56.

It is important to note that although the terms defined above refer to measuring two-dimensional particle profiles using microscopic measuring techniques, it is understood that the features extend to the three-dimensional form. Automated image analysis of particle size, shape and features is recognized by one skilled in the art as a reliable, reproducible method of measuring particle characteristics.

Cubic boron nitride (cBN) grains are known to be produced from hexagonal boron nitride catalyst systems (primarily alkali and alkaline earth metal nitrides, amides, hydroxides and hydrides) under high pressures and temperatures for a time period sufficient to form the cubic structure. The reaction mass is maintained under pressure and temperature conditions that thermodynamically favor the formation of cubic boron nitride crystals, polycrystals or aggregated cubic boron nitride material. The cubic boron nitride is then recovered from the reaction mass using a combination of water, acidic solutions and/or caustic chemicals using recovery methods known in the art. It should be noted that other methods of producing cubic boron nitride are known, i.e., cubic boron nitride prepared via a temperature gradient method or a shock wave method, and modification of the process taught in the instant application may be used to produce the abrasive grains having unique features.

Any combination of starting ingredients, which provide both the hexagonal boron nitride and the catalyst nitride, can be employed. An embodiment of the starting reaction mixture may contain a source of boron, a source of nitrogen, and a source of catalyst metal. The source of the boron can be elemental boron, hexagonal boron nitride, or a material such as one of the boron hydrides which will decompose to elemental boron under conditions of the reaction. The source of nitrogen can be either hexagonal boron nitride or, a nitrogen-containing compound of a catalyst metal which will provide a source of nitrogen under reaction conditions. The catalyst metal may be employed as the elemental metal or a catalyst compound which will decompose to the catalyst metal or to the catalyst metal nitride under-reaction conditions.

A catalyst that may be used is magnesium. It should be understood that other catalysts may be used depending on the method used to prepare the cubic boron nitride. Catalysts may also be selected from the class of alkali metals, alkaline earth metals, tin, lead, antimony, water containing ammonium compounds, or hydrazine.

The process is not limited to the catalytic conversion of hexagonal boron nitride to cubic boron nitride involving only one catalyst material. Thus, mixtures of two or more catalyst materials can be employed. These mixtures can include one or more catalyst metals, one or more catalyst nitrides or one or more combinations of metals and nitrides. In addition, alloys can also be employed in the practice of the invention. These alloys include alloys of more than one catalyst metal as well as alloys of a catalyst metal and a non-catalyst metal. Other raw material combinations as possible.

The process may be carried out in any type of apparatus capable of producing the pressures and temperatures used to manufacture the abrasive. Apparatus of the type described in U.S. Pat. Nos. 2,941,241 and 2,941,248.

This apparatus includes a reaction volume in which controllable temperatures and pressures are provided and maintained for desired periods of time. The apparatus disclosed in the aforementioned patents is a high pressure device for insertion between the platens of a hydraulic press. The high pressure device consists of an annular member defining a substantially cylindrical reaction area, and two conical, piston-type members or punches designed to fit into the substantially cylindrical portion of the annular member from either side of said annular member. A reaction vessel which fits into the annular member may be compressed by the two piston members to reach the desired pressures in the manufacturing the grains having unique features. The temperature necessary is obtained by any suitable means, such as, for example, by induction heating, direct or indirect resistive heating or other methods.

FIGS. 1 through 3 illustrate an example of an apparatus which has been successfully employed for maintaining the sustained pressures and temperatures for the manufacturing the grains having unique features. Although herein described, other high pressure/high temperature apparatus may alternatively be used such as belt presses, cubic presses, torroidal and piston-cylinder presses.

As shown in FIG. 1, the reaction mass to be subjected to high pressure and high temperature is positioned in a hollow cylindrical reaction vessel 32, which in this specific illustration is formed of pyrophyllite. Pyrophyllite may been chosen as for vessel 32 because it is readily machinable to the desired shape and is inert to the reactants used in the process. Inside of reaction vessel 32 is positioned a conducting metal tube, which in this specific illustration is formed of tantalum. The reaction mass is positioned within the central aperture in conducting metal tube 33. In this specific illustration, the reaction mass consists of lumps of catalyst metal or catalyst metal nitride which are mixed with powdered hexagonal boron nitride. The reaction vessel 32 is closed or sealed at each end by electrically conducting metal end disks 34.

Reaction vessel 32 is subjected to pressures by applying force to the high pressure-high temperature apparatus by means of piston 14 of the press. The desired pressure is reached the reaction vessel is, brought to the desired temperature by electrical resistance heating of the contents of reaction vessel 32 by means of current passing through tube 33. Specifically, electrical current is supplied from one electrical connector, such as upper connector 19 to upper conducting ring 18, upper rings 25, 24, 23, upper punch 22, upper ring 36, upper disk 34, and to the tube 33 and its contents. The electrical path from the bottom of tube 33 to lower connector 19 is similar to the conducting path described above. After the reaction vessel has been held at the desired pressure and temperature for the desired time, the electrical current to the reaction vessel is cut off and the pressure is released. Cubic boron nitride which has been formed is then removed from the reaction vessel.

Although the apparatus of FIGS. 1 through 3 includes a pyrophyllite reaction vessel surrounding a titanium tube, it should be understood that other modifications of this apparatus may be employed. Since the function of conducting metal tube 33 is to act as a resistance heater to heat the contents of tube 33 to the desired temperature, it should be understood that any conducting material may be employed. Thus, these tubes may be constructed of nickel, molybdenum, or other non-catalytic metal in addition to tantalum. In addition, tube 33 may also be formed of a catalyst metal. In the case where tube 33 is formed of a catalyst metal, the tube is filled with hexagonal boron nitride and the tube itself acts as a catalyst for the conversion of the hexagonal boron nitride to cubic boron nitride. Satisfactory results are obtained when tube 33 is formed-of carbon or graphite instead of being formed of metal. In addition, pyrophyllite reaction vessel 32 may contain a number of electrically conducting regions therein, which may be metallic and/or non-metallic. Thus, pyrophyllite cylinder 32 can surround a graphite tube, which in turn surrounds a titanium tube, for example, into which the reaction mixture is positioned. In another embodiment, conducting tube 33 may be eliminated entirely and replaced by a conducting metal wire which is surrounded by a mixture of reactants, with the conducting wire serving to heat the reactants upon passage of current therethrough.

Although a number of specific reaction vessel assembly structures have been described above, it should be understood that the reaction vessel is not critical to the carrying out the process used to manufacturing the grains having unique features. Any type of structure capable of containing the reactants at the pressure and temperature of the reaction is satisfactory.

Preparation of cubic boron nitride is carried out by subjecting a source of catalyst, a source of nitrogen, and a source of boron to an elevated temperature and pressure. By this procedure, when the reactants are brought to reaction pressure and temperature, an "equilibrium" is established between the reactants so that part of the nitrogen associated with the catalyst becomes associated with the boron so that the reaction mixture at equilibrium contains both the catalyst nitride and cubic boron nitride. The pressure and temperature is selected to be in a range in which the catalyst is operative to catalyze the conversion of hexagonal boron nitride to cubic boron nitride.

The reaction is carried out above certain minimums of pressure and temperature. The reaction temperature may be at least about 1200° C. up to about 3300° C. and carried out at pressures of at least about 5 Gpa. A wide variety of pressures and temperatures may be employed in the method. At higher temperatures and pressure ranges the growth rate of cubic boron nitride is increased. This results in the formation of more growth defects on the faces of the cubic boron nitride, and include point defects, pits, twins and flaws etc. Pressure and temperature ranges used in the manufacture of the grains may be in the cubic boron nitride stable region (See U.S. Pat. No. 2,947,617) and in the range in which the catalyst selected is operative to effect the conversion of hexagonal boron nitride to cubic boron nitride.

Typically, satisfactory conversion of hexagonal boron nitride to cubic boron nitride has been accomplished in times as high as about one hour. In an alternative method, the reactants may be maintained under the reaction conditions for a time of more than about one hour. There are no disadvantages to maintaining the reaction mixture in the cubic boron nitride stable region for extended periods of time and in some cases the size of the cubic boron nitride grains increases with time. Moreover, during this extended period of time, one or more faces of the cubic boron nitride grains may be formed with the features described herein. In general, for over about one hour of reaction time, grains of cubic boron nitride have a maximum dimension of from about 1 to about 1000 microns.

The reaction mass to be subjected to the elevated pressure and temperature is placed into the cylindrical aperture defined by tube 33 and the apparatus is assembled and subjected to a high pressure, such as a pressure of about 5 GPa to about 10 GPa. Electrical energy is then supplied, at a predetermined rate, to the apparatus increasing the temperature increase in the reaction chamber. Temperatures are maintained in the range of at least about 1200° C. up to about 3300° C. Pressure and temperature are maintained in the reaction chamber for at least about one hour.

The cubic boron nitride-containing processed reaction mass produced in the HP/HT process above contain, aside from cubic boron nitride, materials such as low-pressure phase boron nitride (i.e., remaining unreacted hBN, pBN, rBN, and recrystallized hBN), catalysts, graphite materials, vessel components and pyrophyllite. Thus, to produce the cubic boron nitride grains having unique features, they must be separated and recovered from the processed reaction mass. The cubic boron nitride grains are separated and recovered from the processed reaction mass using chemical and/or physical processes.

The processed reaction mass is first separated from the vessel by a hammer or other device. This initial separation step also crushes the processed reaction mass so that it may be further processed to separate the cubic boron nitride grains from the processed reaction mass. The separated pieces from the processed reaction mass are then put into a container of water (maintained at a temperature of about 60° C.) and mixed for about 20 minutes. Any container or method of mixing the water and separated pieces may be used, i.e., a metal container. A suitable device used for mixing is an automated laboratory mixer known in the art. It should be understood that the times and temperatures are not limited to those described above. Various modifications are possible, i.e., longer or shorter mixing times, i.e., less than about 20 minutes or greater than 20 minutes, and higher or lower temperatures, i.e., less than about 60° C. or greater than 60° C. so long as the processed reaction mass is adequately mixed.

After mixing the separated pieces, the coarse materials of the mass are further separated from the fine materials using a metal sieve. Typically, a metal sieve having a 1 mm×1 mm screen opening, is placed over a container, i.e., a barrel or the like. The separated pieces are put into the sieve and sprayed with water. Once the water has reached the top of the container, it is poured off and water is then sprayed again. This process is repeated for about five minutes and causes the fine materials to pass through the sieve and into the container. After this initial sieving process, the fine materials, which settle to the bottom of the container, are decanted. It should be noted that the process may be repeated for longer than about five minutes, if necessary.

Decantation is performed to further separate the cubic boron nitride grains from hBN particles, ceramic dust and graphite dust. To decant the fine materials, they are first dried, via a furnace, a heat lamp or other device capable of drying the fine materials, for about 20 minutes at a temperature of about 80° C. The fine materials are then put into a canister containing a plurality of metal balls and milled for about five minutes. A Turbula® mixer may be used to mill the fine materials. The milling action breaks up the coarse materials and further refines the cubic boron nitride grains. Subsequently, the decantation and heating steps may be repeated to further purify the cubic boron nitride grains. It should be understood that the times and temperatures are not limited to those described above. Various modifications are possible, i.e., longer or shorter mixing times, i.e., less than about 20 minutes or greater than 20 minutes, and higher or lower temperatures, i.e., less than about 80° C. or greater than 80° C. so long as the fine materials are adequately dried.

Figure 4:
FIG. 4 is an SEM (Scanning Electron Microscope) image of a conventional cubic boron nitride grain.

After the aforementioned processes, some cubic boron nitride grains may exhibit surface defects known as "pitting". Pitting is typically caused by point defects and/or impurities retained during initial growth of the cubic boron nitride grains. After recovery of the cubic boron nitride grains, pitting may be observed appearing as triangular indentations on the surface of the grain. It should be noted that the features on the grains should be differentiated from "pitting". Pits are shown in FIGS. 4 at 60, 62 and 64.

After decantation, to further refine the cubic boron nitride grains, the cubic boron nitride grains are cleaned using caustic or strong acidic chemicals. The chemicals may include one or more of the following selected from the group of alkali metal hydroxides, such as lithium hydroxide, sodium hydroxide, potassium hydroxide, potassium carbonate, sodium peroxide, potassium dichromate and potassium nitrate, etc. The chemicals may also include a combination of alkali metal hydroxides. A useful combination in the process is potassium hydroxide (greater than about 90% active content) and sodium hydroxide (greater than about 95% active content) in a powder or granular form. Useful amounts are between about 10 percent by weight to about 90 percent by weight potassium hydroxide in combination with between about 90 percent by weight to about 10 percent by weight sodium hydroxide. Alternatively, between about 10 percent by weight to about 30 percent by weight potassium hydroxide and between about 90 percent by weight to about 70 percent by weight sodium hydroxide may be used. Useful combinations of caustic chemicals is about 10 percent by weight potassium hydroxide and about 90 percent by weight sodium hydroxide. Acidic chemicals, such as hydrogen fluoride, may also be used.

Caustic or acidic chemicals, as described above, are combined with the cubic boron nitride grains. Caustic or acidic chemicals may be present in amounts of from about 50 percent by weight to about 99 percent by weight about 50 percent by weight to about 95 percent by weight; or about 50 percent by weight to about 75 percent by weight. Cubic boron nitride grains may be present in amounts from about 50 percent by weight to about 1 percent by weight; from about 50 percent by weight to about 5 percent by weight; or from about 50 percent by weight to about 25 percent by weight. The amounts present in the mixture of caustic or acidic chemicals and cubic boron nitride grains are dependent on how effectively the cubic boron nitride abrasive grains were cleaned and separated after synthesis and decantation. For example, if there is more unconverted hBN, catalysts, graphite materials, and pyrophyllite particles which coexist with cubic boron nitride after decantation then more caustic chemicals may be used. Or, likewise, if the cubic boron nitride grains are clean after decantation, only a small amount of caustic chemicals are used.

In an embodiment, the cubic boron nitride grains are added to the container which contains caustic powder or granules or vice versa. The volume of the container varies from about 0.1 L to about 25 L depending on amount of cubic boron nitride grains to be cleaned. The mixture may be left as is, or it may be agitated as is known to one skilled in the art. The container, including the mixture of caustic chemicals and cubic boron nitride grains, may be heated in a furnace as the furnace temperature ramps up, i.e., increasing at rate of, from about 5° C./min to about 20° C./min. Or, alternatively, the crucible may be heated in a preheated furnace.

Regardless of the heating method used, the temperature used is in the range of at least about 400° C. to about 800° C. for about 10 minutes to about 200 minutes so as to cause the caustic chemicals reach a molten state. Heating the mixture cleans the cubic boron nitride grains and finalizes the formation of features on the grains. Cleaning at lower temperatures, i.e., about 400° C. to about 500° C., may result in longer heating times, i.e., about 60 minutes to about 200 minutes. In the alternative, when higher temperatures are used, i.e., greater than about 600° C. to about 800° C. shorter heating times are used, i.e., about 10 minutes to about 60 minutes.

It should be noted that other combinations of temperature and times may be used outside of these ranges. For example, if a temperature above about 800° C. is selected, a shorter time period may be used. As is expected, the time of heating the grains and caustic chemicals will be increased in a large-scale operation, i.e., up to about 8 hours or more. After the heating cycle, the container is then cooled to about 60° C. or lower. Water is then added to the mixture to dissolve the caustic chemicals.

Reaction of the cubic boron nitride grains with caustic or acidic chemicals thoroughly cleans the cubic boron nitride grains and can accentuate features on the cubic boron nitride grains. The shape, size and distribution of the features on the cubic boron nitride grain are dependent on the amount of caustic or acidic chemicals, temperature, pressure, time of reaction and concentration of the cubic boron nitride grains. It should be noted that regardless of the times and temperatures used, the weight loss of the cubic boron nitride grains should be controlled to be greater than about 5% w/w.

In an alternative embodiment, the cubic boron nitride grains may be subsequently treated with an acid mixture to remove any additional graphite dust. Acid mixtures include those selected from the group of nitric/sulfuric acid mixtures and phosphoric/sulfuric acid mixtures. For example, a mixture of nitric and sulfuric acids (initial mole ratio of nitric to sulfuric acid of 0.017 to 2.43) at a temperature of between about 100° to about 300° C. can be used to clean grains for a time of from 10 minutes to 12 hours.

In one embodiment, the caustic or acidic chemicals are at 100% concentration, i.e., in a molten state. It should be understood that aqueous solutions of caustic or acidic chemicals may alternatively be used. It should also be noted that large-scale production of the cubic boron nitride grains may be used using the aforementioned ranges of cubic boron nitride mixture and caustic or acidic chemicals. Further, although cubic boron nitride grains are discussed, other superabrasive grains may be subject to the process described above to refine the features.

The cubic boron nitride grains are then sieved through a mesh screen of the appropriate mesh size for the desired size of finished grains. It may be desirable for many uses to have abrasive grit of a selected specific size range within the broad range of from about 1 micron in diameter up to about 1 cm. Sizing can be accomplished in any suitable manner. For example, for selected smaller sizes, one can employ sieving using selected matched U.S. Standard wire mesh sieves of the following sizes: Nos. 20, 25, 30, 35, 40, 45, 50, 60, 70, 80, 100, 120, 140, 170, 200, 230, 270, 325 and 400, using a 100 gram ±5 gram sieve load and a Tyler Rotap for 15 minutes. For larger sizes, one can hand select grains within a desired selected size range. Sizing accuracy can be determined by testing in accordance with ANSI Standard B74.16-1971.

Defective growth and twinning of the cubic boron nitride grains, during the HP/HT process discussed in detail above, produces cubic boron nitride grains with defects. These include vacancies, impurities, and mismatches between lattice planes which cause localized high strain energy in the vicinity of the defect regions. After final cleaning with the caustic chemicals, unique features are exhibited on the at least one of the faces of the cubic boron nitride grains. These unique features may be visible as concave indentations, peaks, valleys, bumps, or ellipsoid shapes as described below. The features may be present in a pattern resembling waves, blisters, feathers or fish scales. Combinations of the aforementioned features and patterns may also be present. The features and patterns are described below and shown in FIGS. 8-11, FIGS. 12A-12D, FIGS. 13A-13D and FIG. 14.

The features vary and can depend on the type of cubic boron nitride abrasive grain. For example, due to the difference in catalyst chemistries and/or pressure and temperature conditions during the initial cubic boron nitride growth, the type of feature formed on the cubic boron nitride grain may vary. A feature can be formed on (111) face, such as on a nitrogen terminated (111) face.

Figure 6:
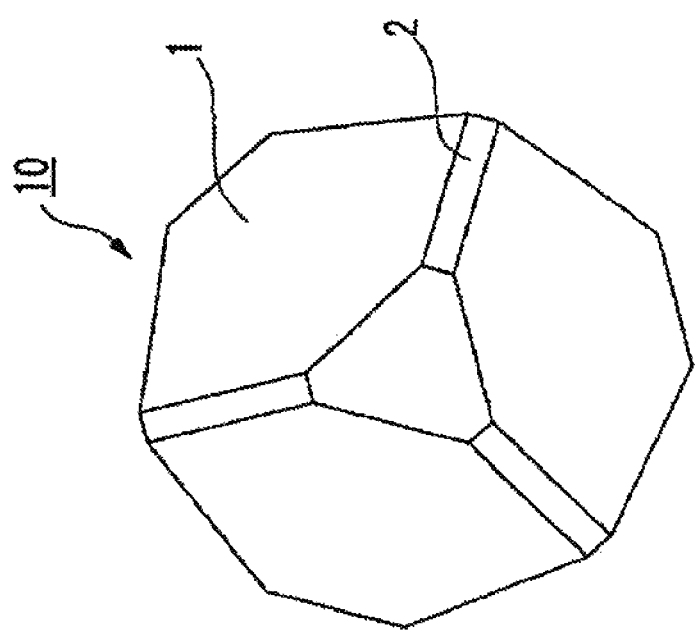
FIG. 6 schematically shows the appearance of a conventional cubic boron nitride abrasive grain.
Figure 7B:
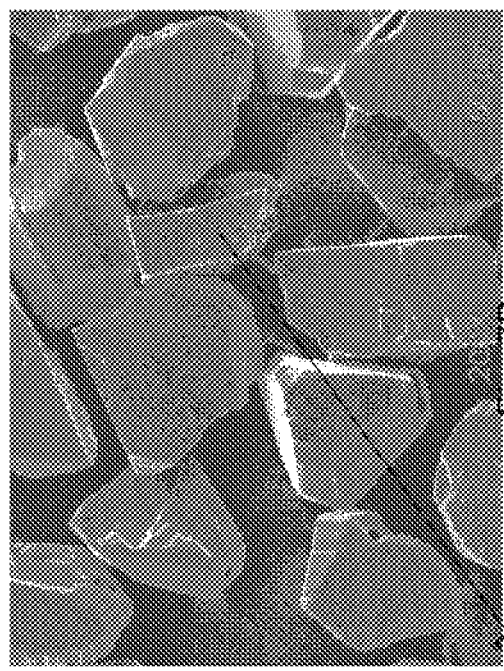
FIGS. 7A-7D are SEM images showing conventional cubic boron nitride grains.
Figure 7D:
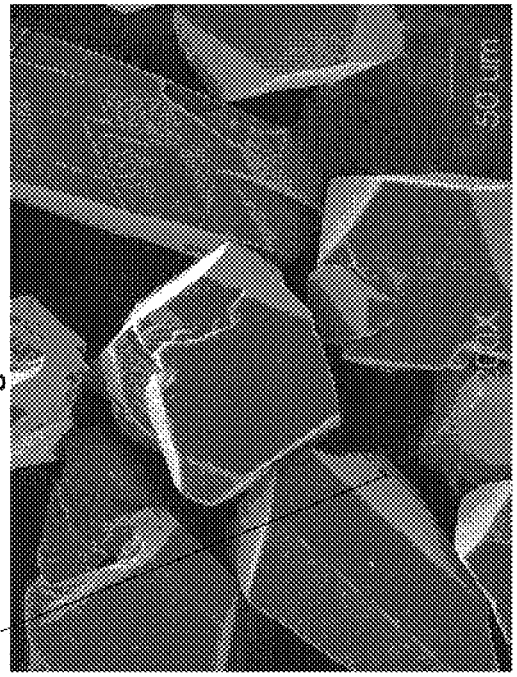
Figure 7A:
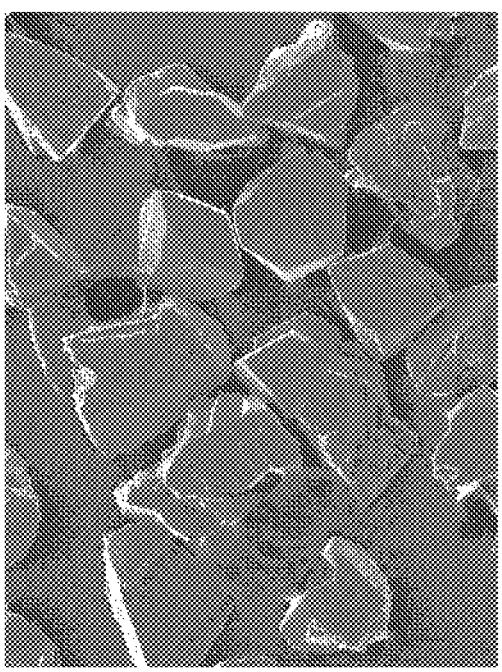
Figure 7C:
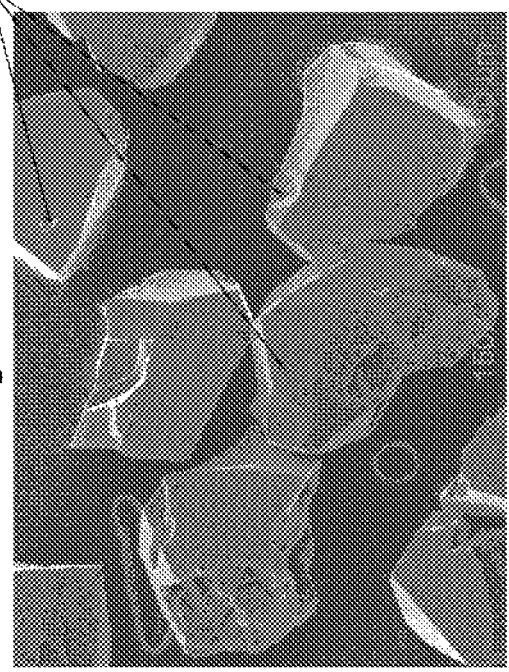

FIG. 5 schematically shows the appearance of a conventional superabrasive grain that has not been produced by the aforementioned process. The superabrasive grain may be a cubic boron nitride abrasive grain having a truncated tetrahedron structure including (111) faces, with most grains having smooth, uniform growth surfaces. FIG. 6 schematically shows the appearance of another conventional cubic boron nitride abrasive grain. The cubic boron nitride abrasive grain 10 shown in FIG. 6, has an octahedral structure including faces 1. Examples of conventional cubic boron nitride grains which have not been produced by following the method described herein are shown in SEM images in FIGS. 7A-7D. Evidence of pitting, as previously described above, and in FIG. 4, is also shown in FIGS. 7B, 7C and 7D as pits 3.

Cleaning of the cubic boron nitride grains with caustic or acidic chemicals and subsequent heating of the grains further reveals the defects and growth patterns formed during the HP/HT process. Cleaning, at temperatures of about 400° C. or higher, releases stresses produced during HP/HT syntheses of the cubic boron nitride grains. Thus, the stressed regions are removed and leave island-like structures 53 as shown on the grain 50 in FIG. 8.

Figure 8:
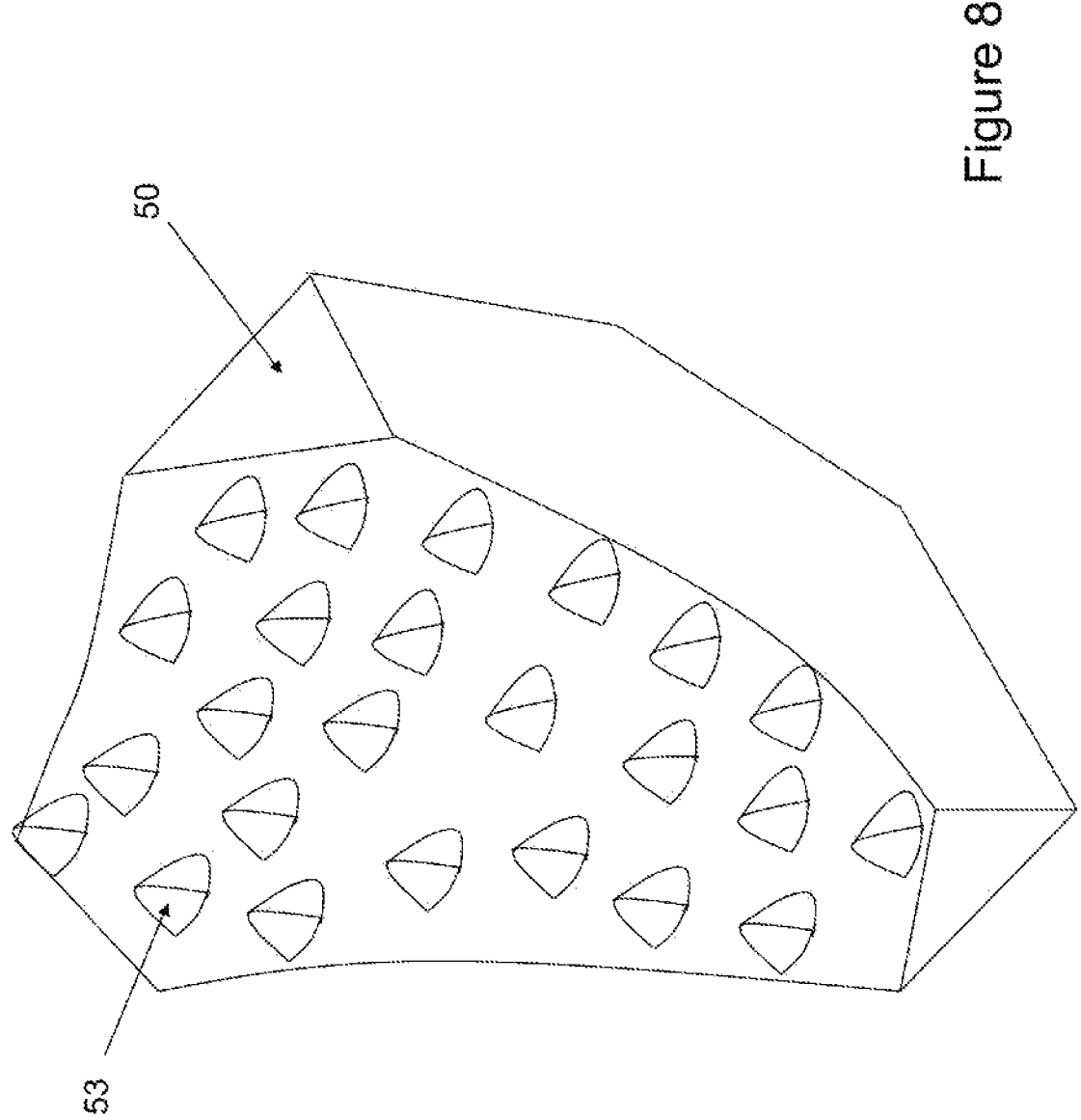
FIG. 8 schematically shows an embodiment of a cubic boron nitride grain.
Figure 9:
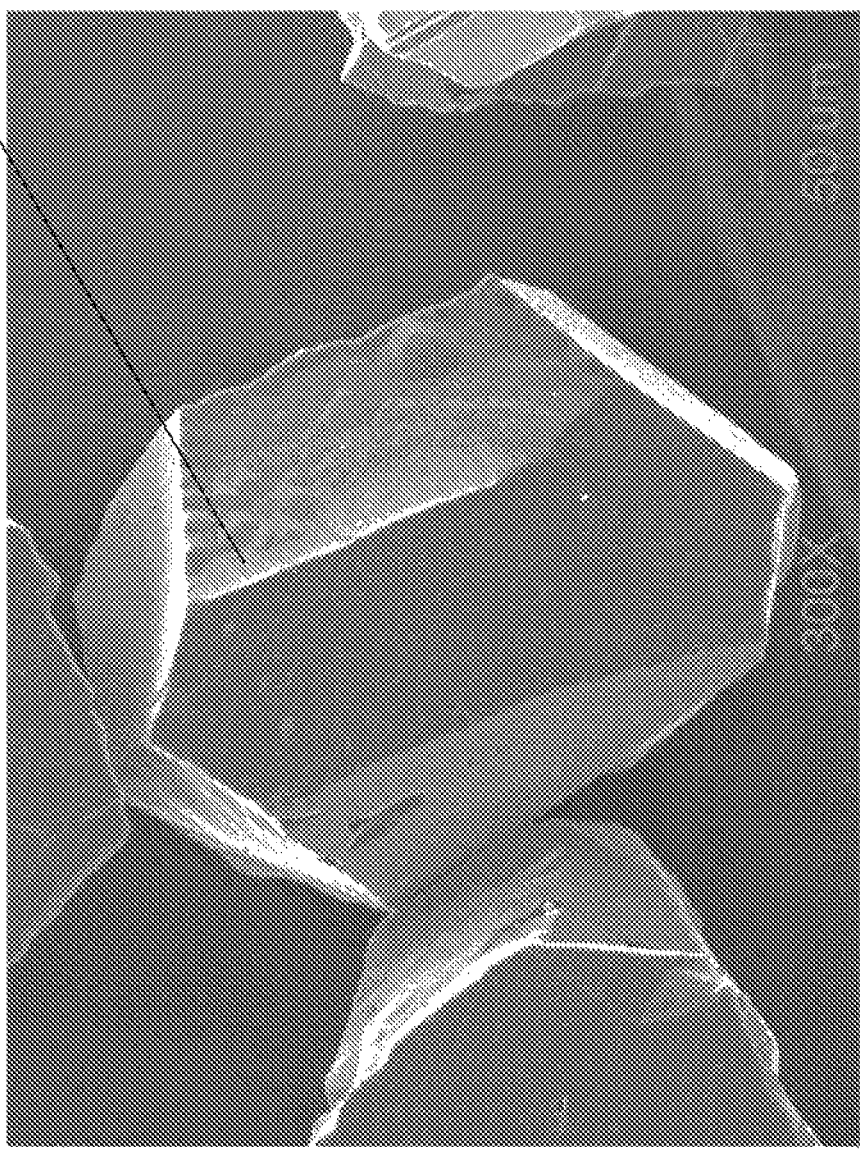
FIG. 9 is an SEM (Scanning Electron Microscope) image showing an embodiment of the cubic boron nitride grain.

FIG. 8 schematically shows one example of the appearance of a superabrasive grain 50 having three-dimensional features 53 formed by the process taught herein. In this case, the features 53 are formed largely on the faces of the grains and appear as tetrahedral, half-ellipsoid structures. The features 53 may also have well-defined grain faces. In practice, the features of the grains may not be uniform throughout the entire face, nor uniformly distributed. Moreover, at least one face, after caustic or acidic reaction, may be concave as shown in FIG. 9 at 59.

FIG. 10 shows examples of the peaks and valleys which may be found on a grain 50. The peak 52, as shown is the highest level projecting from a reference surface 54 of the grain 50. A valley 56 is shown as a surface below a reference surface 54 of the grain 50. FIG. 11 schematically illustrates a cross section view of the bonding region between an abrasive grain 50 and bond materials 51 which can be for example, a vitreous bond, a metal bond, or a resin bond, etc. The unique features 53, 55 physically retain the cubic boron nitride grains in the bond materials 51.

Figure 12B:
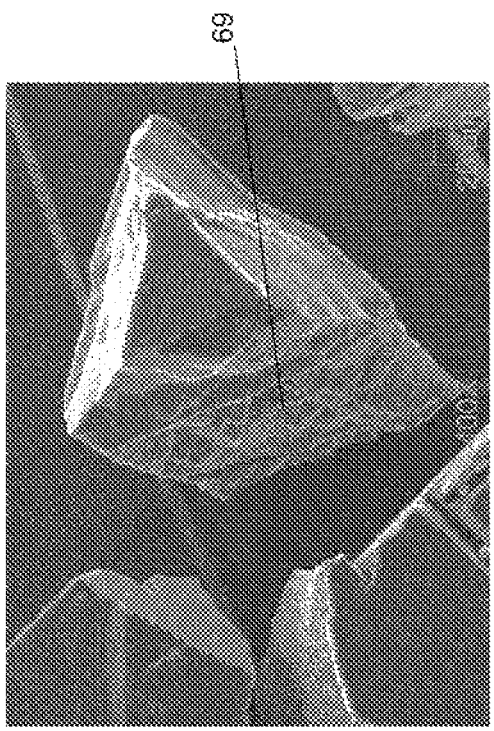
FIGS. 12A-12D are SEM (Scanning Electron Microscope) images showing embodiments of the cubic boron nitride grains.
Figure 12D:
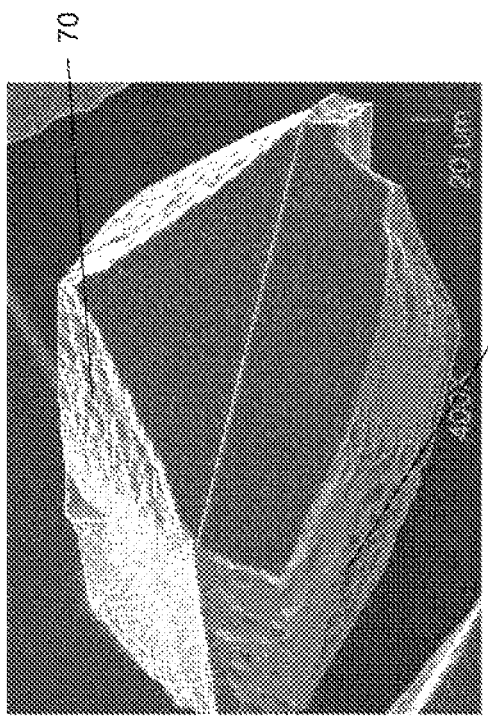
Figure 12A:
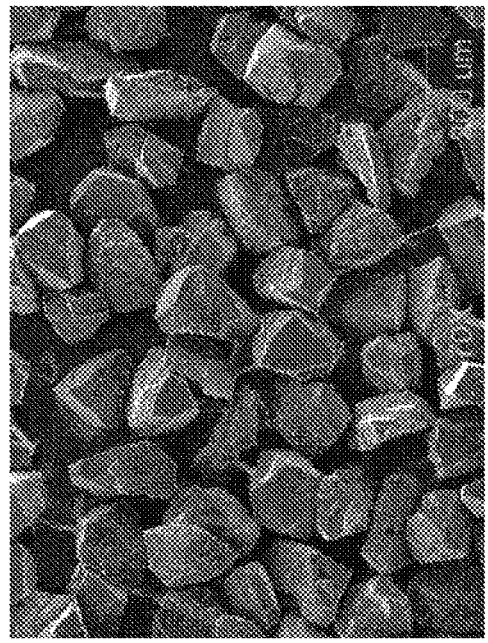
Figure 12C:
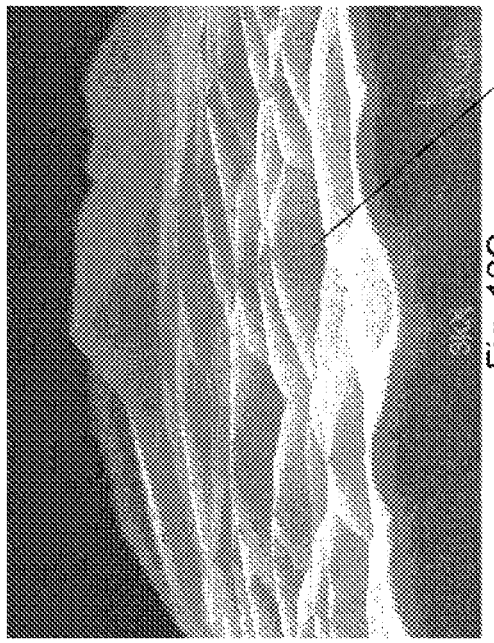
Figure 13A:
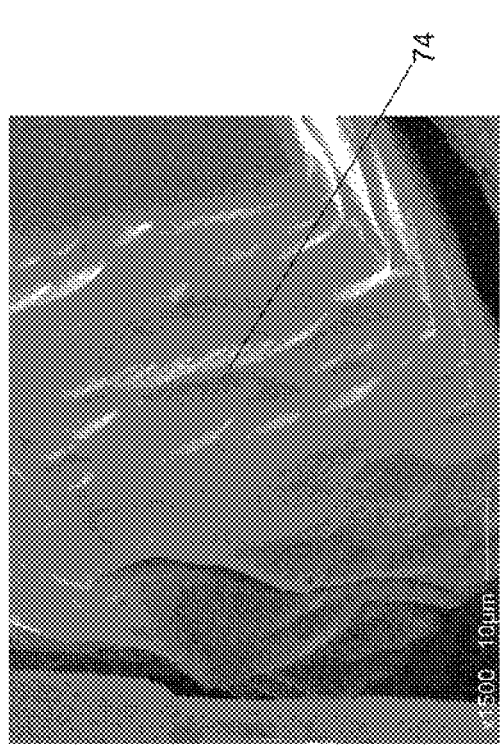
FIGS. 13A-13D are SEM (Scanning Electron Microscope) images showing embodiments of the cubic boron nitride grains.
Figure 13B:
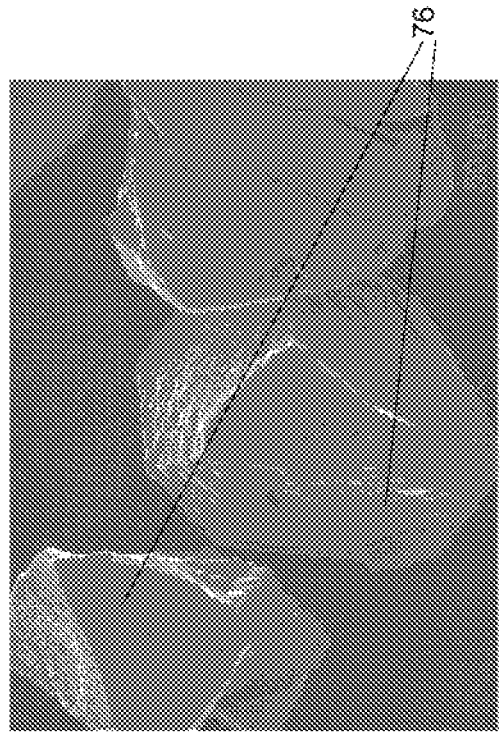
Figure 13C:
Figure 13D:
Figure 14:
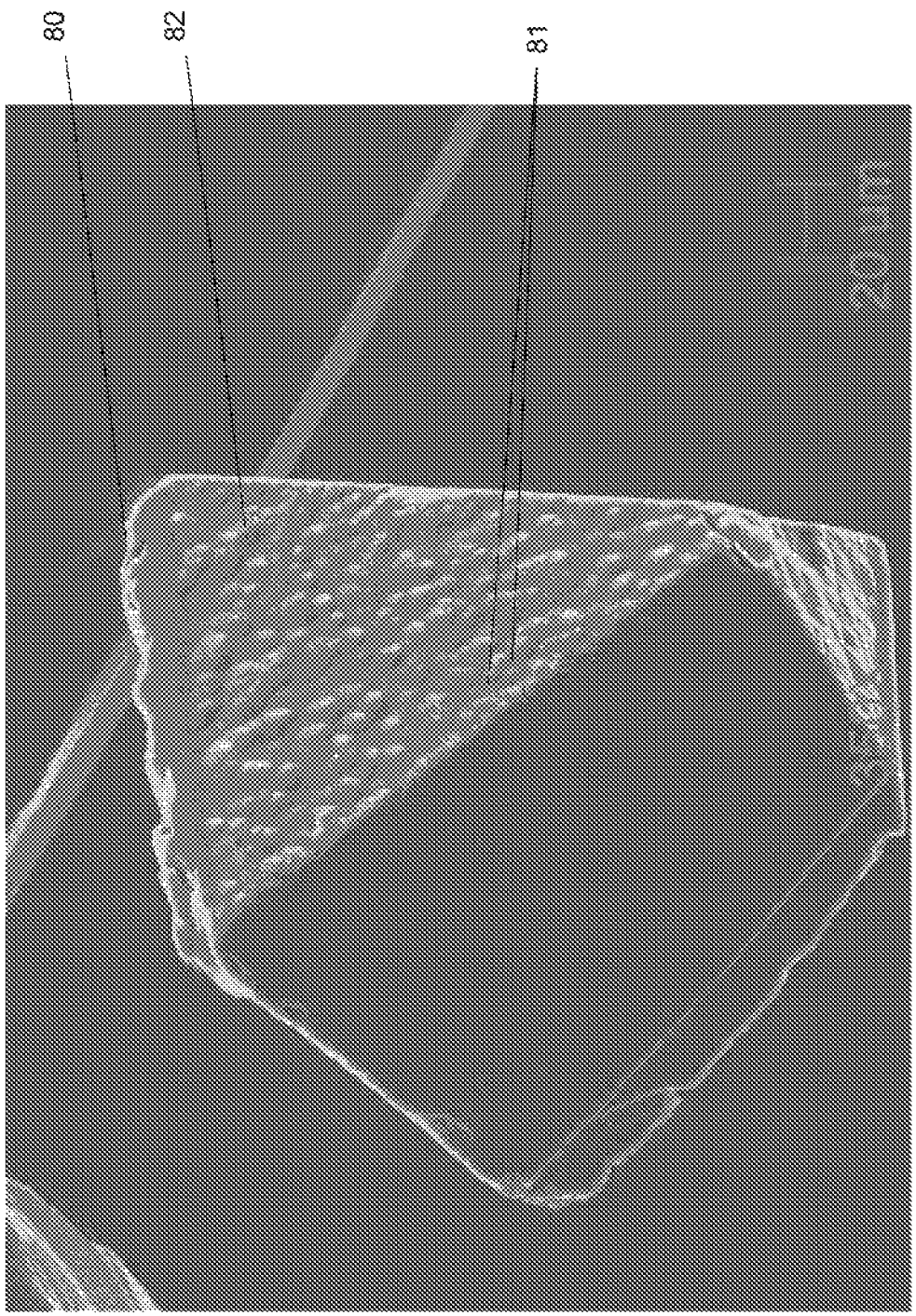
FIG. 14 is an scanning electron microscope (SEM) image showing an embodiment of the cubic boron nitride grain.

FIGS. 12A-12D and FIGS. 13A-13D are SEM images showing different embodiments of the cubic boron nitride grains having unique features. The distributed features appear as waves, blisters, bumps and may be in a pattern resembling fish scales or feathers. The features may vary in size, regularity and appearance. As shown in FIGS. 12A and 12B and in FIGS. 13A-13D features cover at least a portion of at least one face of the cubic boron nitride grains. FIG. 12A shows a population of inventive cubic boron nitride grains having features. FIG. 12B depicts an inventive cubic boron nitride grain including bumps 69 as features. In FIG. 12C, a wave-like distribution pattern 66 is shown. FIG. 12D shows half-ellipsoid shapes 68 as well as blisters 70 on the grain. FIG. 13A depicts features on the face of a grain occurring in a feathering pattern 72. FIG. 13B shows a fish-scale pattern 74 of features. FIG. 13C depicts the features as bumps 78 and FIG. 13D shows the features as blisters 76. FIG. 14 shows an embodiment of a cubic boron nitride grain having unique features. Cubic boron nitride grain 80 includes features 81 appearing in a fish-scale pattern 82.

The features on the cubic boron nitride grains, which increase retention force between the bond and the abrasive grains, will be more specifically explained below. A feature is defined as an integral feature on at least one face of the grain that juts out from a reference surface on the grain. The size of the feature is defined by a) feature height, (h): the length of the perpendicular drawn from the top-most point of the feature to its base; b) feature lateral length, (l): the diameter of the smallest circle that completely circumscribes the two-dimensional projection of the feature. The height and lateral length of a feature can be determined by observing a cross-section of an abrasive grain, and by measuring the size of the feature at the face of the cubic boron nitride taken by SEM.

When the feature has a portion in which the ratio of the lateral length to the grain size is larger than about 0.01, and a ratio of the height to the grain size is larger than about 0.005, the feature increases retention force between the bond and the abrasive grain. For improved retention of the grain the bond system, the ratio of the lateral length to the grain size may be 0.05 or more, and the ratio of the height to the grain size may be 0.02 or more. The size of the grains, grain size, in one embodiment is in the range of about 1000 µm to about 1 µm, and, in another embodiment, in the range of about 500 µm to about 80 µm. With regard to mesh sizes, the sizes of the abrasive grains of in one embodiment vary from about 30+ to about 400+ mesh size, and can extend to micrometer range, for example about 1 micrometer. The size distribution in one can be a narrow size distribution, for example 120/140, or can also be a variety of mesh sizes, for example mixed abrasive grains in sizes from about 30– to about 400+.

A feature may include a half-ellipsoid shape or appear as a bump or an elongated bump. Features on the cubic boron nitride grains of one embodiment may have a height (h) and lateral length (l) of greater than about 0.1 micron. The features may be random or may be in a patterned arrangement. The number of features can be determined by counting all of the features observed on each face of the abrasive grain. The measured height, lateral length and number of the features vary depending on grain size and treatment conditions. It is useful to have at least three features on at least one face of a grain such that the height (h) and lateral length (l) of the features is greater than about 0.1 micron. Some features on the grains have at least one face with concave depths greater than about 1.0 micron. The ratio of the depth to grain size is in a range of 0.01 to 0.15.

The unique cubic boron nitride grains of an embodiment may be coated. Such coatings include, but are not limited to, metal or metal alloy coatings which may be selected from Ni, Co, Ag, Cu, Mo, Ti, Al, Mn, Cd, Zn, Cr, V. Au, W, Fe, Zn and the Pt-group metals; glass coatings, including but not limited to borosilicate glass, silica glass, fused silica, and soda-lime glass. Metal oxide coatings may also be used, such as $TiO_2$ (titania), $ZrO_2$ (zirconia), $Al_2O_3$ (alumina), and $SiO_2$ (silica). Carbide coatings may also be used and include carbide coatings such as TiC, WC, and SiC, etc. The coatings may include combinations of the aforementioned coatings and multiple layers of coatings. The coatings may include also include multi-phase coatings. The grain may be partially or completely coated.

Figure 16:
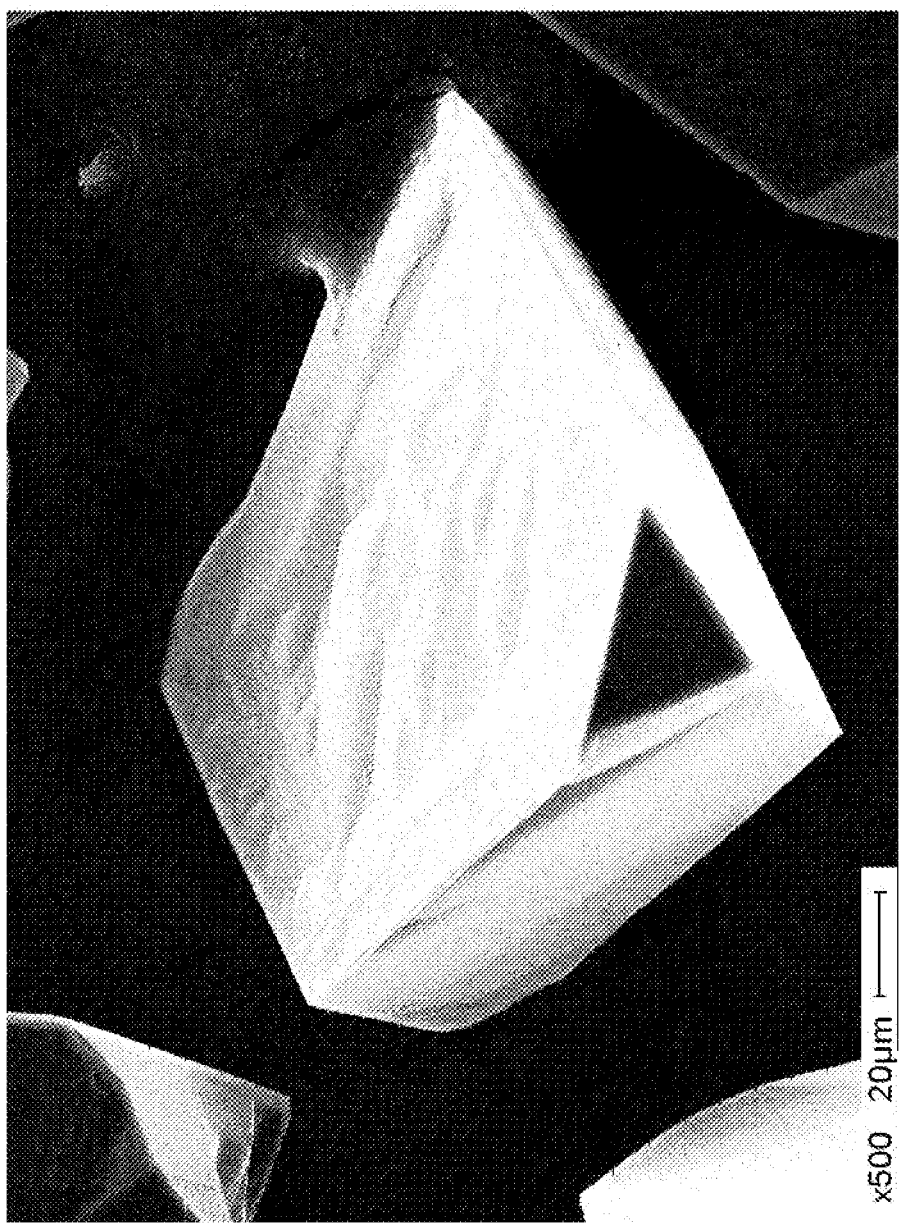
FIG. 16 is an scanning electron microscope (SEM) image showing an embodiment of the cubic boron nitride grain.

In another embodiment, the features on the grains may be obtained by an alternative method. A reaction mass is formed, as previously described above, using a desired pressure and temperature for cubic boron nitride growth to occur (see to U.S. Pat. No. 2,947,617). After achieving cBN crystal growth, the pressure is reduced below the equilibrium line of cBN (see U.S. Pat. No. 2,947,617) for a time exceeding about 30 seconds to allow for limited dissolution of the grains. This results in the features described in the instant application. FIG. 16 shows a cBN grain made from this method.

The cell pressure and temperature is then reduced to atmospheric level and the grains are recovered via conventional means as described above. The grains are then cleaned using the process described above, however the temperature used for cleaning is between about 290° C. to about 400° C. for about 5 to about 10 minutes.

In addition to cubic boron nitride, other abrasive grains not formed by an HP/HT process may be milled, recovered and/or cleaned as described above. Examples of abrasive grains may include calcium carbonate, emery, novaculite, pumice dust, rouge, sand, ceramics, alumina, glass, silicon carbide, and zirconia alumina.

The grains are useful in many applications, including but not limited to, fine grinding, fixed abrasive grinding, electroplated bonded tools, ultrasonic machining, surface grinding, cylindrical grinding, plunge and noncylindrical grinding, thread and internal grinding, centerless grinding, creep feed grinding, belt grinding, finishing operations (honing, lapping, wire brushing, superfinishing, polishing (with or without magnetic fields) and buffing), chemical mechanical planarization, electrochemical machining, chemical machining, wire EDM applications, and abrasive water-jet machining. The grains may also be used in free abrasive slurries.

Example I

Performance of the cubic boron nitride grains in vitrified bond grinding systems was measured by comparing two sets of grinding wheels made by Wendt Dunnington. Identical wheels were made using conventional Borazon® cubic boron nitride 1000 product (80/100 mesh size) (Diamond Innovations, Inc., Worthington, Ohio) and the cubic boron nitride having unique features as taught herein. The cubic boron nitride product having unique features had over 90% of the cubic boron nitride grains including at least one face on the grain. The average dimension of the features on each grain was larger than 2 micrometers in height and 5 micrometers in lateral length.

Both wheels had the same bond systems and manufactured with the same processing conditions and equipment. The grinding test conditions for both types of cubic boron nitride grains were identical (see Table 1). The work piece used for the grinding tests was Inconel 718. The grinding conditions are shown in Table 2.

Figure 15:
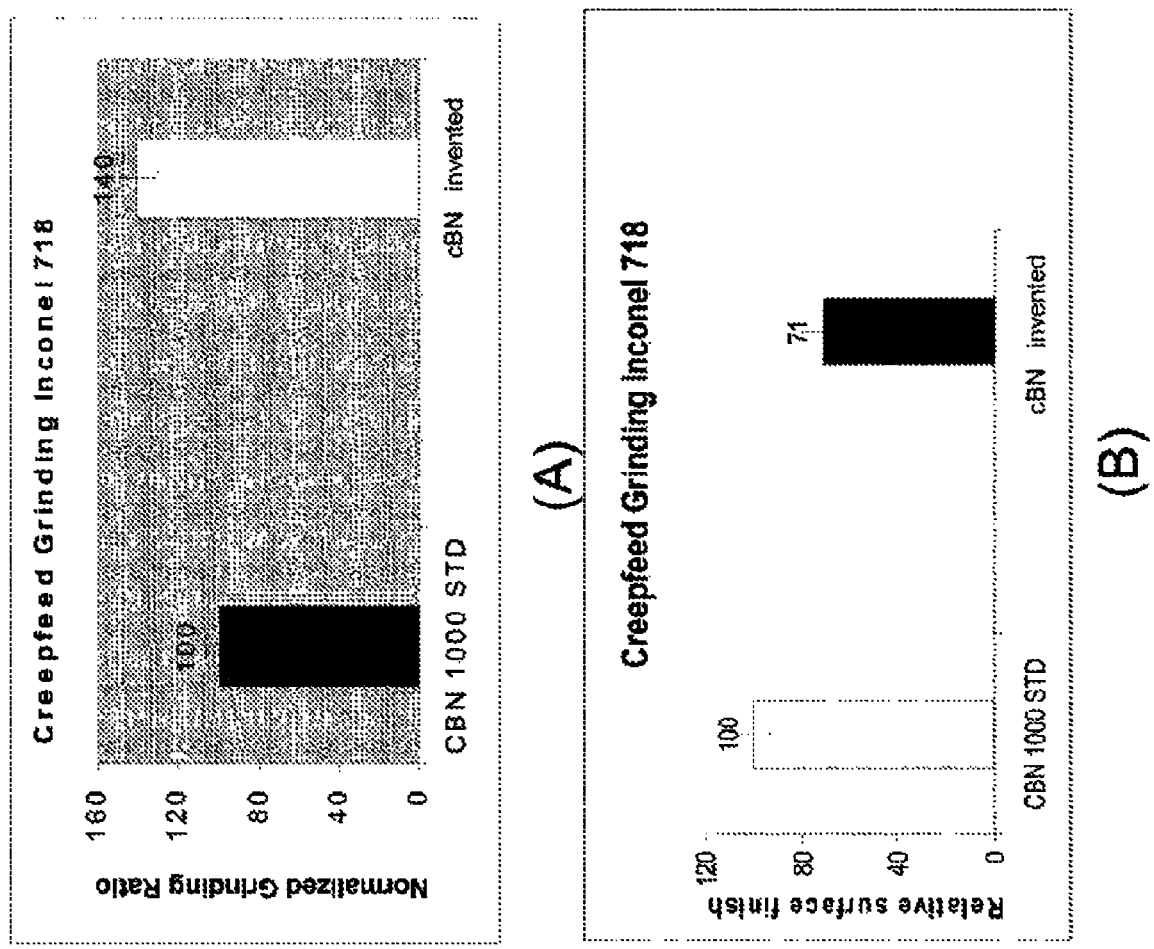
FIG. 15 includes graphs (A) and (B) showing results of grinding tests comparing the grains having unique features to conventional cubic boron nitride grains.

Identical creepfeed grinding tests were conducted for both wheels and monitored radial wheel wear, grinding power, and surface finish. Grinding ratio was determined such that the volume of work piece materials grounded at the threshold of necessary surface finish was divided by volume of wheel wear and shown in FIG. 15A. For clarity, the grinding ratio of the conventional Borazon® cubic boron nitride 1000 was normalized to 100% in FIG. 15A. In FIG. 15A, conventional Borazon® cubic boron nitride 1000 is shown as "Cubic Boron Nitride 1000 STD" while the cubic boron nitride grains having unique features described as "Cubic Boron Nitride INVENTED". The grinding ratio of the wheels made containing cubic boron nitride grains having unique features was 40% higher than that for the conventional Borazon® cubic boron nitride 1000 wheel, demonstrating improved grinding performance. Grinding power was similar for both groups of wheels. The surface finishes were 30% better for cubic boron nitride having unique features relative to conventional Borazon® cubic boron nitride 1000 grains (see FIG. 15B).

Example II

Performance of the cubic boron nitride grains in vitrified bond grinding systems was measured by comparing two sets of grinding wheels made by Wendt Dunnington. Identical wheels were made using conventional Borazon® cubic boron nitride 1000 product (80/100 mesh size) (Diamond Innovations, Inc., Worthington, Ohio) and the cubic boron nitride having unique features as taught herein. The cubic boron nitride product having unique features had over 90% of the cubic boron nitride grains including at least one face on the grain. The average dimension of the features on each grain was larger than 2 micrometers in height and 5 micrometers in lateral length.

TABLE 1

| Grinding Wheel Specification | |
|---|---|
| Wheel Type | 1A1 |
| Wheel Diameter | 6.9' (175 mm) |
| Wheel Width | 0.250 (6.3 mm) |
| Mesh Size | 80/100 FEPAB252 |

TABLE 1-continued

| Grinding Wheel Specification | |
|---|---|
| Wheel Manufacturer | Wendt Dunnington \ |
| Bond Type | Vitrified N275-V250/12 |
| Abrasive Types | Borazon ® cBN 1000 and cBN (having unique features) |

TABLE 2

| Grinding Test Conditions | |
|---|---|
| Machine | Blohm Precimat 306, 15 hp CNC surface grinder |
| Grind Mode | Creepfeed (upcut) |
| Wheel Speed (vs) | 9,000 SFPM (45 m/sec) |
| Depth of Cut (ae) | 0.050" (1.25 mm) |
| Table Speed ($v_t$) | 9.5 ipm (0.24 m/min) |
| Width of Cut ($b_d$) | 0.130" (3.3 mm) |
| Length of Cut | 5.2" (132 mm) |
| Specific Matl. Removal Rate ($Q/_W$) | 0.45 in³/in/min (4.8 mm³/mm/sec.) |
| Workpiece Material | Inconel 718 |
| Coolant | Master Chemical Trim VHPE-320 Water Soluble Oil at 5% concentration |
| Coolant Flow | 40 gpm at 125 psi/entry and exit nozzles (151 liters/min at 8.3 bar) |
| Cleaning jet | 3 gpm at 500 psi (0.8 liters/min at 33.3 bar) |

Equivalents

Although the invention has been described in connection with certain exemplary embodiments, it will be evident to those of ordinary skill in the art that many alternatives, modifications, and variations may be made to the disclosed invention in a manner consistent with the detailed description provided above. Also, it will be apparent to those of ordinary skill in the art that certain aspects of the various disclosed example embodiments could be used in combination with aspects of any of the other disclosed embodiments or their alternatives to produce additional, but not herein explicitly described, embodiments incorporating the claimed invention but more closely adapted for an intended use or performance requirements. Accordingly, it is intended that all such alternatives, modifications and variations that fall within the spirit of the invention are encompassed within the scope of the appended claims.

The invention claimed is:

1. An uncoated abrasive or superabrasive grain having at least one grain face comprising three or more features projecting from said grain face wherein the height (h) and the lateral length (l) of each feature is greater than about 0.1 micron, wherein the features comprise at least one of peaks, valleys, concave indentations and half-ellipsoids, in a pattern comprising at least one of blisters or fish scales.

2. The grain of claim 1, wherein said grain has at least one face on the grain is concave having a depth greater than about 1.0 micron.

3. The grain of claim 2, wherein the concave face is smooth.

4. The grain of claim 2, wherein the concave face comprises a plurality of peaks and valleys in which the height between the peak and valley is greater than about 0.1 micron.

5. The grain of claim 1, wherein said superabrasive grain is a cubic boron nitride grain.

6. The grain of claim 1, wherein said grain further comprises a coating material selected from the group of metals, metal alloys, glass, metals oxides and carbide.

7. A plurality of superabrasive grains in which at least about 15% of the grains have at least one grain face comprising three or more features wherein the height (h) and the lateral length (l) of each feature is greater than about 0.1 micron wherein said grains are free of coating material, wherein said grains are free of coating material, wherein the features comprise at least one of peaks, valleys, concave indentations and half-ellipsoids, in a pattern comprising at least one of blisters or fish scales.

8. The grains of claim 7, wherein at least about 20% of the grains have at least one face on the grain that is concave having a depth greater than about 1.0 micron.

9. The grains of claim 8, wherein the concave face is smooth.

10. The grains of claim 7, wherein said superabrasive grains are cubic boron nitride grains.

11. The grains of claim 8, wherein the concave face comprises a plurality of peaks and valleys in which the height between the peak and valley is greater than about 0.1 micron.

12. The grains of claim 7, wherein at least about 20% of the grains have at least one face that comprises a) concave with a depth greater than about one (1.0) micron, wherein the face is either smooth or irregularly fluctuant; and b) with more than three features on at least one face; wherein the height (h) and the lateral length (l) of each feature is greater than about 0.1 microns.

13. The grains of claim 7, wherein at least about 20% of the grains have a combination of two or more of the following face types: smooth, irregularly fluctuant, concave, and faces with at least three features per face such that the height (h) and lateral length (l) of said features is greater than about 0.1 microns.

14. The grains of claim 7, wherein the features are uniformly orientated on the face of the grain.

15. The grains of claim 7, wherein the features are randomly distributed on the face of the grain.

16. The grains of claim 7, wherein said features exist in grain mesh sizes ranging from about 30– to about 400+.

17. The grains of claim 7, wherein said features exist in grain mesh sizes of 30+ and 400–.

18. The grains of claim 7, wherein said features exist in grain sizes of about 10 microns or less.

19. A cutting tool which comprises abrasive grains according to claim 1.

20. The tool of claim 19, which is in the form of a grinding wheel.

21. The tool of claim 19, which is in the form of a drill bit.

22. The tool of claim 19, which is in the form of a saw blade.

23. A plurality of superabrasive grains in which at least about 15% of the grains have at least one grain face comprising three or more features wherein the height (h) and the lateral length (l) of each feature is greater than about 0.1 micron and wherein at least about 20% of the grains have at least one face on the grain that is concave having a depth greater than about 1.0 micron, wherein said grains are free of coating material, wherein the features comprise at least one of peaks, valleys, concave indentations and half-ellipsoids, in a pattern comprising at least one of blisters or fish scales.

24. The grains of claim 23, wherein said superabrasive grains are cubic boron nitride grains.

25. A grain comprising at least one face having at least three features on said face wherein the height of said features is greater than about 1% of the diameter of the grain, wherein the features comprise at least one of peaks, valleys, concave indentations and half-ellipsoids, in a pattern comprising at least one of blisters or fish scales.

26. A grain comprising at least one concave face wherein the depth of said concave face is greater than about 3% of the diameter of the grain, wherein the features comprise at least one of peaks, valleys, concave indentations and half-ellipsoids, in a pattern comprising at least one of blisters or fish scales.

27. A method of making a plurality of cubic boron nitride (cBN) grains comprising the steps of: providing a plurality of hexagonal boron nitride (hBN) grains; providing a catalyst; subjecting said hBN grains and said catalyst to high pressure and high temperature for a time period sufficient to form a reaction mass containing cBN grains; and cleaning said cBN grains from said reaction mass using a combination of water and acidic solutions or caustic chemicals, wherein at least about 15% of said plurality of cBN grains have at least one grain face comprising three or more features wherein the height (h) and the lateral length (l) of each feature is greater than about 0.1 micron, wherein said grains are free of coating material, wherein the features comprise at least one of peaks, valleys, concave indentations and half-ellipsoids, in a pattern comprising at least one of blisters or fish scales.

28. A plurality of cBN grains made from the method of claim 27 wherein at least one grain face on each of said plurality of grains comprises three or more features projecting from said grain face wherein the height (h) and the lateral length (l) of each feature is greater than about 0.1 micron.

29. The method of claim 27, wherein said cBN grains have an average weight loss of more than about 5% w/w of the weight loss compared to conventional cBN grains not subjected to said method.

30. A method of making a plurality of cubic boron nitride (cBN) grains comprising the steps of: providing a plurality of hexagonal boron nitride (hBN) grains; providing a catalyst; subjecting said hBN grains and said catalyst to high pressure and high temperature for a time period sufficient to form a reaction mass containing cBN grains; reducing the pressure below for a time exceeding about 30 seconds to allow for limited dissolution of said cBN grains; reducing the temperature and pressure to atmospheric level; and cleaning said cBN grains from said reaction mass using a combination of water and acidic solutions or caustic chemicals, at a temperature of about 290° C. to about 400° C. for about 5 to about 10 minutes, wherein at least about 15% of said plurality of cBN grains have at least one grain face comprising three or more features wherein the height (h) and the lateral length (l) of each feature is greater than about 0.1 micron, wherein said grains are free of coating material, wherein the features comprise at least one of peaks, valleys, concave indentations and half-ellipsoids, in a pattern comprising at least one of blisters or fish scales.

31. An uncoated abrasive or superabrasive grain having at least one grain face comprising three or more features projecting from said grain face wherein the height (h) and the lateral length (l) of each feature is greater than about 0.1 micron and wherein said grain has at least one face on the grain is concave having a depth greater than about 1.0 micron, wherein the features comprise at least one of peaks, valleys, concave indentations and half-ellipsoids, in a pattern comprising at least one of blisters or fish scales.

* * * * *